(12) United States Patent
Benisty (10) Patent No.: US 11,755,238 B2
(45) Date of Patent: Sep. 12, 2023

(54) CONTINUOUS NAND DATA-TRANSFER USING FILLING RATE EVALUATION APPROACH

(71) Applicant: Western Digital Technologies, Inc., San Jose, CA (US)

(72) Inventor: Shay Benisty, Beer Sheva (IL)

(73) Assignee: Western Digital Technologies, Inc., San Jose, CA (US)

( * ) Notice: Subject to any disclaimer, the term of this patent is extended or adjusted under 35 U.S.C. 154(b) by 113 days.

(21) Appl. No.: 17/492,175

(22) Filed: Oct. 1, 2021

(65) Prior Publication Data

US 2023/0109229 A1 Apr. 6, 2023

(51) Int. Cl.
*G06F 3/06* (2006.01)

(52) U.S. Cl.
CPC .......... *G06F 3/0655* (2013.01); *G06F 3/0604* (2013.01); *G06F 3/0679* (2013.01)

(58) Field of Classification Search
CPC .................................. G06F 5/14; G11C 11/14
See application file for complete search history.

(56) References Cited

U.S. PATENT DOCUMENTS

| 7,836,273 | B1 | 11/2010 | Norman |
| 9,658,822 | B1* | 5/2017 | O'Connor ................. G06F 5/14 |
| 9,996,486 | B2 | 6/2018 | Zehavi et al. |
| 10,592,122 | B2 | 3/2020 | Manohar et al. |
| 2007/0101168 | A1 | 5/2007 | Atkinson |
| 2017/0109058 | A1* | 4/2017 | Shallal ................. G06F 3/0656 |
| 2018/0373968 | A1* | 12/2018 | Bakker ............... G06K 15/022 |
| 2019/0065116 | A1 | 2/2019 | Sekine |
| 2019/0259445 | A1* | 8/2019 | Ho ...................... G11C 11/4094 |
| 2020/0293198 | A1 | 9/2020 | Anazawa |

* cited by examiner

*Primary Examiner* — Getente A Yimer
(74) *Attorney, Agent, or Firm* — PATTERSON + SHERIDAN, LLP; Steven H. VerSteeg (57) ABSTRACT

A data storage device includes a memory device and a controller coupled to the memory device. The controller is configured to deliver a continuous DQS signal, determine whether a fill rate of a write buffer or an emptying rate of read buffer is sufficient to continuously send user data to the memory device or from the memory device, evaluate timing for sending or receiving the user data, and transfer data to or from the memory device continuously with the DQS signal. The data sent to the memory device includes the user data and garbage data, where the user data and the garbage data are separately transferred. The data received from the memory device includes user data that is sampled and user data that is not sampled, where the user data that is sampled and the user data that is not sampled are separately received.

19 Claims, 6 Drawing Sheets

CONTINUOUS NAND DATA-TRANSFER USING FILLING RATE EVALUATION APPROACH

BACKGROUND OF THE DISCLOSURE

Field of the Disclosure

Embodiments of the present disclosure generally relate to data storage devices, such as solid state drives (SSDs), and, more specifically, continuous data-transfer to and from a memory device of the data storage device.

Description of the Related Art

Data input or data output may be paused on a NAND interface by placing the data bus in an idle state. The pausing of data input may be completed by pausing DQS (DQS_t/DWS_c) and holding the relevant signal(s) static high or low until the data burst is resumed. The data burst may be paused if the DQS (DQS_t/DQS_c) or RE_n (RE_t/RE_c) is paused such that the current input/output frequency is not maintained for the data burst. WE_n is held high during data input and output burst pause time.

In similar approaches, a controller of the data storage device uses the DQS signal in order to pause the data-transfer. In another approach, the controller may raise the ALE/CLE signals for pausing the transfer and then issue the warm up cycle to start sending the data again. In yet another approach, the controller incorporates bigger buffers in the read paths and the write paths. However, in each of the approaches, latency may be increased and extra system requirements may be needed.

Therefore, there is a need the art for an improved data-transfer that is continuous.

SUMMARY OF THE DISCLOSURE

The present disclosure generally relates to data storage devices, such as solid state drives (SSDs), and, more specifically, continuous data-transfer to and from a memory device of the data storage device. A data storage device includes a memory device and a controller coupled to the memory device. The controller is configured to deliver a continuous DQS signal, determine whether a fill rate of a write buffer or an emptying rate of read buffer is sufficient to continuously send user data to the memory device or from the memory device, evaluate timing for sending or receiving the user data, and transfer data to or from the memory device continuously with the DQS signal. The data sent to the memory device includes the user data and garbage data, where the user data and the garbage data are separately transferred. The data received from the memory device includes user data that is sampled and user data that is not sampled, where the user data that is sampled and the user data that is not sampled are separately received.

In one embodiment, a data storage device includes a memory device and a controller coupled to the memory device. The controller is configured to deliver a continuous DQS signal, determine whether a fill rate of write buffer is sufficient to continuously send user data to the memory device, evaluate timing for sending the user data to the memory device, and transfer data to the memory device continuously with the DQS signal.

In another embodiment, a data storage device includes a memory device and a controller coupled to the memory device. The controller is configured to deliver a continuous DQS signal, determine whether an emptying rate of read buffer is sufficient to continuously receive user data from the memory device, evaluate timing for receiving the user data from the memory device, and receive data from the memory device continuously with the DQS signal, wherein the data that is continuously received comprises user data that is sampled, wherein user data that is sampled is continuously received when the read buffer is less than full, wherein the data that is continuously received comprises user data that is not sampled, wherein user data that is not sampled is continuously received when the read buffer is full, and wherein the user data that is sampled and the user data that is not sampled are separately received.

In another embodiment, a data storage device includes memory means and a controller coupled to the memory means. The controller is configured to receive/send data continuous to/from the memory means, wherein the data comprises user data and garbage data, wherein the user data and garbage data is received/sent separately, and measure a fullness of a buffer storing the data being sent/received, wherein the garbage data is sent/received when the fullness of the buffer is below a predetermined level.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specifically described embodiments. Instead, any combination of the following features and elements, whether related to different embodiments or not, is contemplated to implement and practice the disclosure.

Furthermore, although embodiments of the disclosure may achieve advantages over other possible solutions and/or over the prior art, whether or not a particular advantage is achieved by a given embodiment is not limiting of the disclosure. Thus, the following aspects, features, embodiments, and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

The present disclosure generally relates to data storage devices, such as solid state drives (SSDs), and, more specifically, continuous data-transfer to and from a memory device of the data storage device. A data storage device includes a memory device and a controller coupled to the memory device. The controller is configured to deliver a continuous DQS signal, determine whether a fill rate of a write buffer or an emptying rate of read buffer is sufficient to continuously send user data to the memory device or from the memory device, evaluate timing for sending or receiving the user data, and transfer data to or from the memory device continuously with the DQS signal. The data sent to the memory device includes the user data and garbage data, where the user data and the garbage data are separately transferred. The data received from the memory device includes user data that is sampled and user data that is not sampled, where the user data that is sampled and the user data that is not sampled are separately received.

Figure 1:
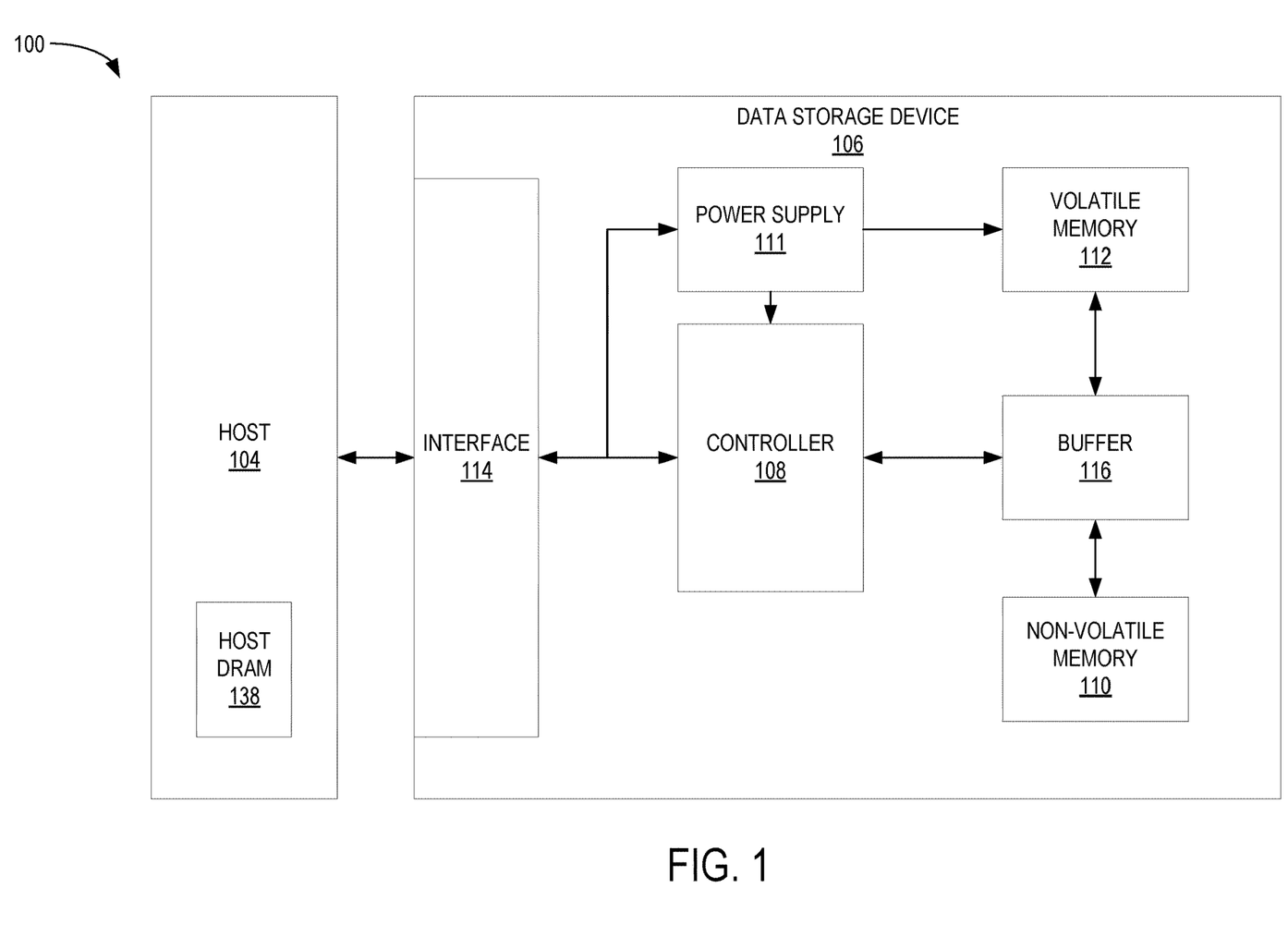
FIG. 1 is a schematic block diagram illustrating a storage system in which a data storage device may function as a storage device for a host device, according to certain embodiments.

FIG. 1 is a schematic block diagram illustrating a storage system 100 in which a host device 104 is in communication with a data storage device 106, according to certain embodiments. For instance, the host device 104 may utilize a non-volatile memory (NVM) 110 included in data storage device 106 to store and retrieve data. The host device 104 comprises a host DRAM 138. In some examples, the storage system 100 may include a plurality of storage devices, such as the data storage device 106, which may operate as a storage array. For instance, the storage system 100 may include a plurality of data storage devices 106 configured as a redundant array of inexpensive/independent disks (RAID) that collectively function as a mass storage device for the host device 104.

The host device 104 may store and/or retrieve data to and/or from one or more storage devices, such as the data storage device 106. As illustrated in FIG. 1, the host device 104 may communicate with the data storage device 106 via an interface 114. The host device 104 may comprise any of a wide range of devices, including computer servers, network-attached storage (NAS) units, desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or other devices capable of sending or receiving data from a data storage device.

The data storage device 106 includes a controller 108, NVM 110, a power supply 111, volatile memory 112, the interface 114, and a write buffer 116. In some examples, the data storage device 106 may include additional components not shown in FIG. 1 for the sake of clarity. For example, the data storage device 106 may include a printed circuit board (PCB) to which components of the data storage device 106 are mechanically attached and which includes electrically conductive traces that electrically interconnect components of the data storage device 106 or the like. In some examples, the physical dimensions and connector configurations of the data storage device 106 may conform to one or more standard form factors. Some example standard form factors include, but are not limited to, 3.5" data storage device (e.g., an HDD or SSD), 2.5" data storage device, 1.8" data storage device, peripheral component interconnect (PCI), PCI-extended (PCI-X), PCI Express (PCIe) (e.g., PCIe×1, ×4, ×8, ×16, PCIe Mini Card, MiniPCI, etc.). In some examples, the data storage device 106 may be directly coupled (e.g., directly soldered or plugged into a connector) to a motherboard of the host device 104.

Interface 114 may include one or both of a data bus for exchanging data with the host device 104 and a control bus for exchanging commands with the host device 104. Interface 114 may operate in accordance with any suitable protocol. For example, the interface 114 may operate in accordance with one or more of the following protocols: advanced technology attachment (ATA) (e.g., serial-ATA (SATA) and parallel-ATA (PATA)), Fibre Channel Protocol (FCP), small computer system interface (SCSI), serially attached SCSI (SAS), PCI, and PCIe, non-volatile memory express (NVMe), OpenCAPI, GenZ, Cache Coherent Interface Accelerator (CCIX), Open Channel SSD (OCSSD), or the like. Interface 114 (e.g., the data bus, the control bus, or both) is electrically connected to the controller 108, providing an electrical connection between the host device 104 and the controller 108, allowing data to be exchanged between the host device 104 and the controller 108. In some examples, the electrical connection of interface 114 may also permit the data storage device 106 to receive power from the host device 104. For example, as illustrated in FIG. 1, the power supply 111 may receive power from the host device 104 via interface 114.

The NVM 110 may include a plurality of memory devices or memory units. NVM 110 may be configured to store and/or retrieve data. For instance, a memory unit of NVM 110 may receive data and a message from controller 108 that instructs the memory unit to store the data. Similarly, the memory unit may receive a message from controller 108 that instructs the memory unit to retrieve data. In some examples, each of the memory units may be referred to as a die. In some examples, the NVM 110 may include a plurality of dies (i.e., a plurality of memory units). In some examples, each memory unit may be configured to store relatively large amounts of data (e.g., 128 MB, 256 MB, 512 MB, 1 GB, 2 GB, 4 GB, 8 GB, 16 GB, 32 GB, 64 GB, 128 GB, 256 GB, 512 GB, 1 TB, etc.).

In some examples, each memory unit may include any type of non-volatile memory devices, such as flash memory devices, phase-change memory (PCM) devices, resistive random-access memory (ReRAM) devices, magneto-resistive random-access memory (MRAM) devices, ferroelectric random-access memory (F-RAM), holographic memory devices, and any other type of non-volatile memory devices.

The NVM 110 may comprise a plurality of flash memory devices or memory units. NVM Flash memory devices may include NAND or NOR-based flash memory devices and may store data based on a charge contained in a floating gate of a transistor for each flash memory cell. In NVM flash memory devices, the flash memory device may be divided into a plurality of dies, where each die of the plurality of dies includes a plurality of physical or logical blocks, which may be further divided into a plurality of pages. Each block of the plurality of blocks within a particular memory device may include a plurality of NVM cells. Rows of NVM cells may be electrically connected using a word line to define a page of a plurality of pages. Respective cells in each of the plurality of pages may be electrically connected to respective bit lines. Furthermore, NVM flash memory devices may be 2D or 3D devices and may be single level cell (SLC), multi-level cell (MLC), triple level cell (TLC), or quad level cell (QLC). The controller 108 may write data to and read data from NVM flash memory devices at the page level and erase data from NVM flash memory devices at the block level.

The power supply 111 may provide power to one or more components of the data storage device 106. When operating in a standard mode, the power supply 111 may provide power to one or more components using power provided by an external device, such as the host device 104. For instance, the power supply 111 may provide power to the one or more components using power received from the host device 104 via interface 114. In some examples, the power supply 111 may include one or more power storage components configured to provide power to the one or more components when operating in a shutdown mode, such as where power ceases to be received from the external device. In this way, the power supply 111 may function as an onboard backup power source. Some examples of the one or more power storage components include, but are not limited to, capacitors, super-capacitors, batteries, and the like. In some examples, the amount of power that may be stored by the one or more power storage components may be a function of the cost and/or the size (e.g., area/volume) of the one or more power storage components. In other words, as the amount of power stored by the one or more power storage components increases, the cost and/or the size of the one or more power storage components also increases.

The volatile memory 112 may be used by controller 108 to store information. Volatile memory 112 may include one or more volatile memory devices. In some examples, controller 108 may use volatile memory 112 as a cache. For instance, controller 108 may store cached information in volatile memory 112 until the cached information is written to the NVM 110. As illustrated in FIG. 1, volatile memory 112 may consume power received from the power supply 111. Examples of volatile memory 112 include, but are not limited to, random-access memory (RAM), dynamic random access memory (DRAM), static RAM (SRAM), and synchronous dynamic RAM (SDRAM (e.g., DDR1, DDR2, DDR3, DDR3L, LPDDR3, DDR4, LPDDR4, and the like)).

Controller 108 may manage one or more operations of the data storage device 106. For instance, controller 108 may manage the reading of data from and/or the writing of data to the NVM 110. In some embodiments, when the data storage device 106 receives a write command from the host device 104, the controller 108 may initiate a data storage command to store data to the NVM 110 and monitor the progress of the data storage command. Controller 108 may determine at least one operational characteristic of the storage system 100 and store at least one operational characteristic in the NVM 110. In some embodiments, when the data storage device 106 receives a write command from the host device 104, the controller 108 temporarily stores the data associated with the write command in the internal memory or write buffer 116 before sending the data to the NVM 110.

Figure 2:
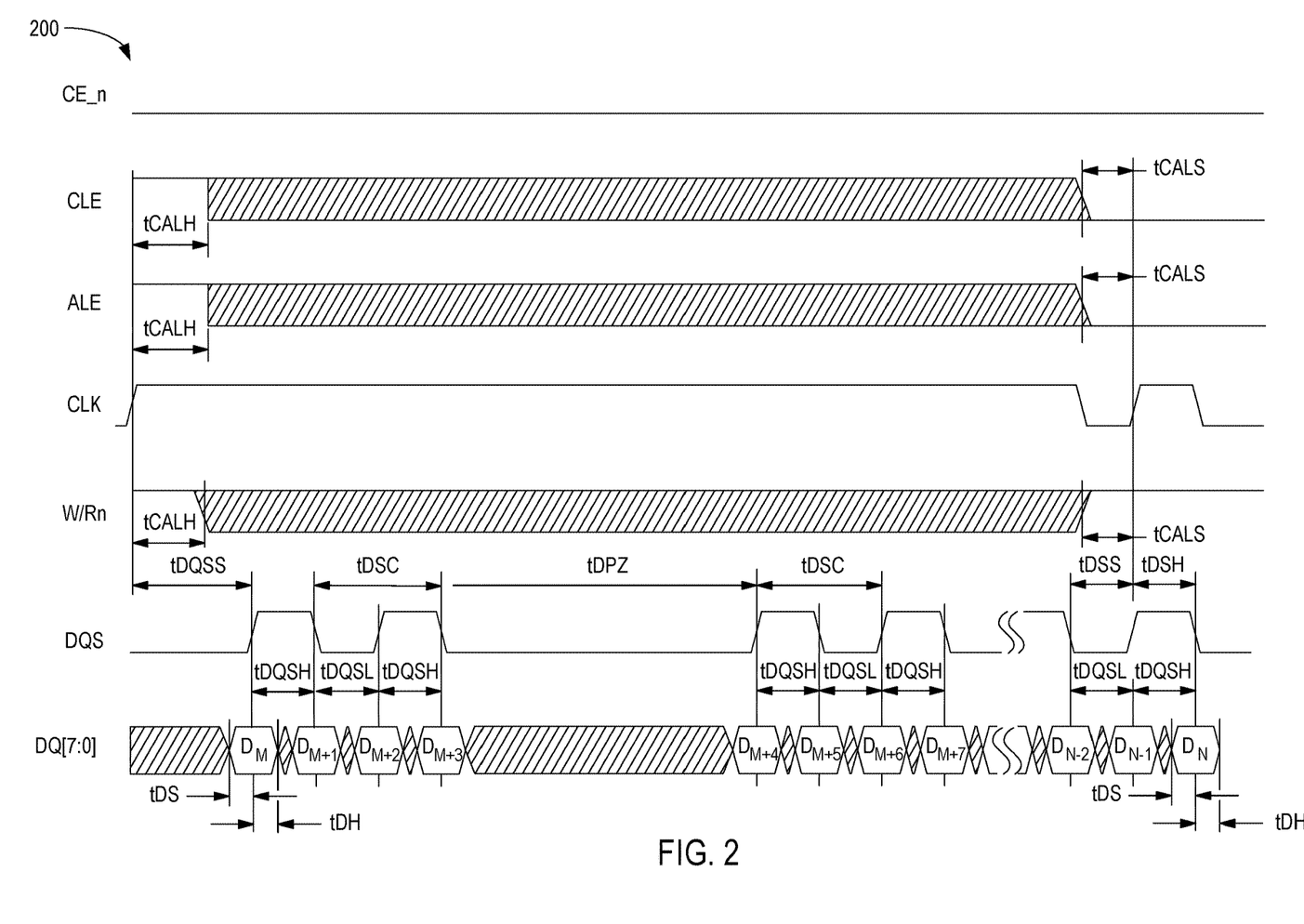
FIG. 2 is an illustration of an example data input cycle timing, according to certain embodiments.

FIG. 2 is an illustration of an example data input cycle timing 200, according to certain embodiments. The example data input cycle timing 200 includes a chip enable (CE_n) signal, a command latch enable (CLE) signal, an address latch enable (ALE) signal, a clock (CLK) signal, a write/read indication (W/R_n) signal, a data strobe (DQS) signal, and a data signal (DQ). The listed signals are not intended to be limiting, but to provide an example of a possible embodiment. It is to be understood that more or less signals are contemplated and may be applicable to the embodiments described herein. The example data input cycle timing 200 may be an example of a controller, such as the controller 108, sending signals to a memory device, such as the NVM 110 of FIG. 1, in order to read data from or write data to the NVM 110.

When the CE_n signal is asserted low, the controller 108 may be able to access the NVM 110. By asserting the CE_n signal low, the NVM 110 is able to accept data bytes written to the memory when a write enable (WE_n) signal is asserted low or enable output of data bytes when a read enable (RE_n) signal is asserted low. When the CE_n signal is asserted high, the NVM 110 ignores the RE_n signal and the WE_n signal. The CLE signal is used to send commands to the NVM 110 from the controller 108 when the CE_n signal is asserted low and the CLE signal is asserted low. The ALE signal is used to latch an address associated with the CLE signal to a respective location in an address register, such as in a logical to physical (L2P) table, when the ALE signal is asserted low.

When the CLK signal is asserted high, data may be transferred to the NVM 110 or read from the NVM 110 back to the controller 108. The W/R_n signal may indicate that a write or a read is occurring to or from the NVM 110. The DQS signal is a clock signal that is toggled in order to drive the DQ signal. The DQ signal sends data to or from the NVM 110 when the DQS signal is toggled. During a write flow, the controller 108 controls drives the data on the DQ signal. During a read flow, the DQS signal and the data are driven by the NVM 110. The controller 108 may stop the DQS signal to stop sending the clock signal, which causes the DQ signal to pause, therefore pausing any data transfers. When working in a high toggle mode, where the DQS signal has a high frequency, pausing a data-transfer may cause signal integrity issues. Likewise, de-asserting the CLE signal and the ALE signal may cause an increase of overhead due to extra warm up cycles.

Figure 3:
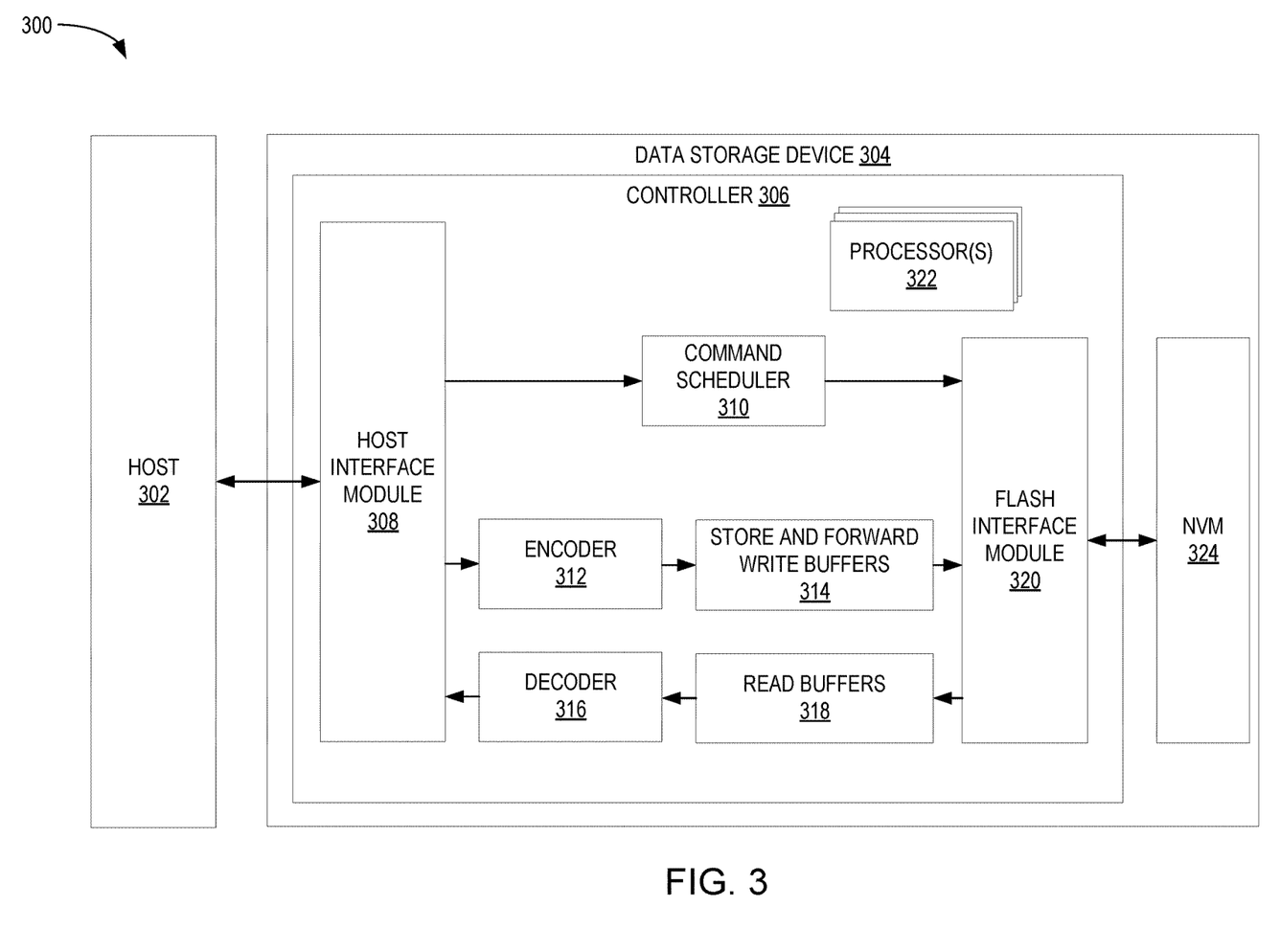
FIG. 3 is a schematic block diagram illustrating a storage system for reading data from and writing data to a memory device, according to certain embodiments.

FIG. 3 is a schematic block diagram illustrating a storage system 300 for reading data from and writing data to a memory device (i.e., an NVM 324), according to certain embodiments. Aspects of the storage system 300 may be similar to the storage system 100 of FIG. 1. The storage system 300 includes a host device 302 and a data storage device 304. It is to be understood that the storage system 300 may include additional components/elements not shown for simplification purposes.

The data storage device 304 includes a controller 306 and an NVM 324. The host device 302 is coupled to a host interface module (HIM) 308 of the controller 306, where the HIM 308 is configured to receive or fetch commands and data from the host device 302 and transfer data and messages (e.g., completion messages, interrupt messages, failure messages, etc.) corresponding to executed commands back to the host device 302. The controller 306 further includes one or more processors 322, a command scheduler 310, an encoder unit 312, one or more store and forward write buffers 314, a decoder unit 316, one or more read buffers 318, and a flash interface module (FIM) 320.

The one or more processors 322 provide instructions and processing (e.g., computational) power in order to execute commands and logic. When a command is received at the HIM 308, the command is transferred to the command scheduler 310. The one or more processors 322 may process the command to determine what type of command was received. Based on the processing, instructions may be generated to a data path in order to process the data at the encoder unit 312 for a write command or at the decoder unit 316 for a read command.

For example, data associated with the write command is sent from the HIM 308 to the encoder unit 312, where the encoder unit 312 encodes the write command data. Encoding the write command data may include generating error correction code, parity data, low-density parity-check data, and the like as well as encrypting the write command data. The encoded data is passed from the encoder unit 312 to the store and forward write buffers 314. Encoded data is stored in the store and forward write buffers 314 and transferred to the NVM 324 when the entire data is present in the store and forward write buffers 314. Because the transfer is initiated once the entire data is present in the store and forward write buffers 314, the store and forward write buffers 314 may need to have a large total capacity since the buffer needs to hold the entire data transfer data.

In another example, data associated with the read command is retrieved by the FIM 320 from a respective location in the NVM 324, the read command data is stored in the read buffers 318. The decoder unit 316 receives the stored read command data and decodes the read command data. The decoding may determine if the data has any bit errors, attempt to correct the bit errors, and provide an indication of whether the decoding passed or failed to the HIM 308 to provide to the host device 302.

Figure 4:
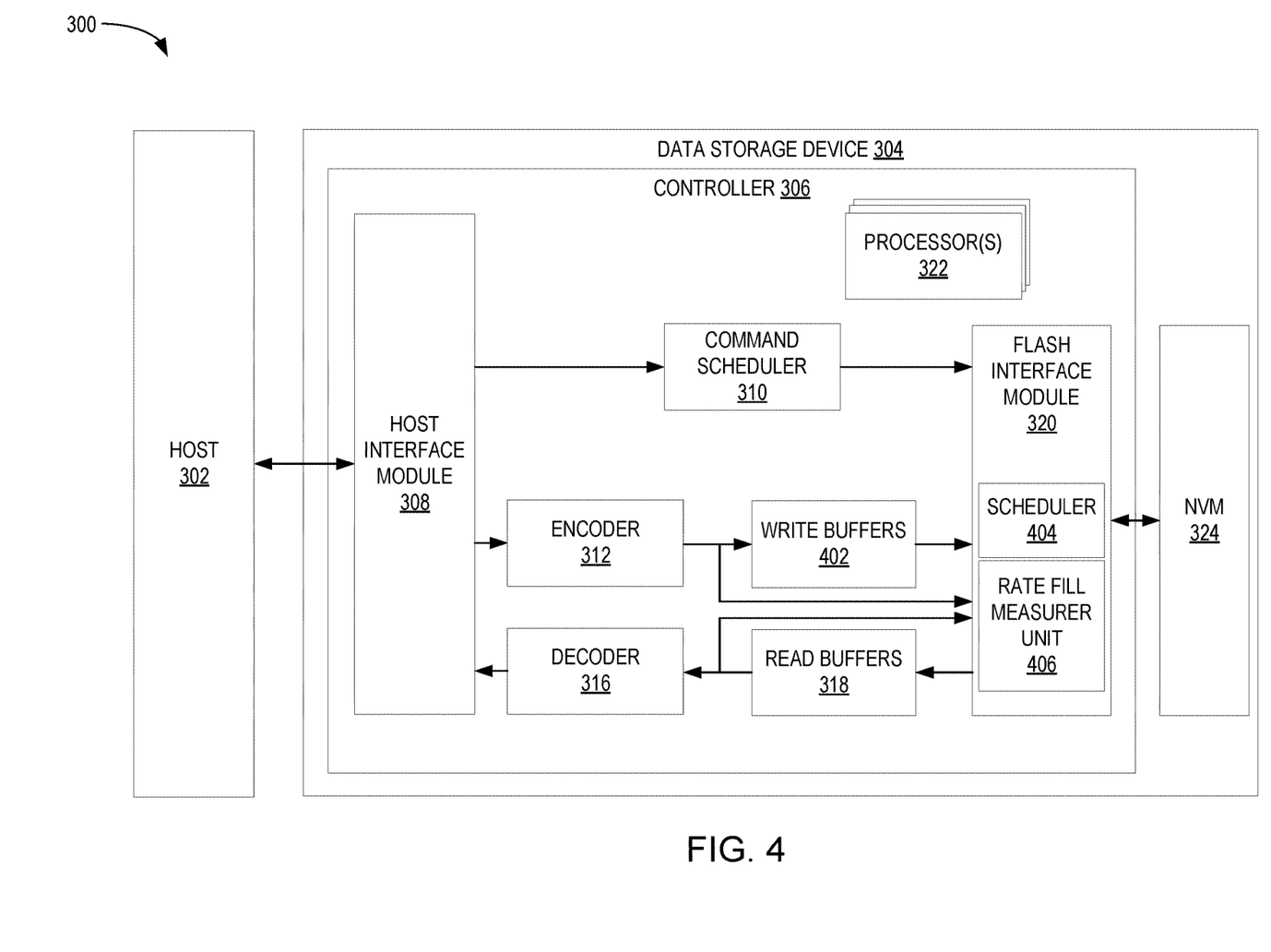
FIG. 4 is a schematic block diagram illustrating the storage system of FIG. 3 having continuous data-transfer, according to certain embodiments.

FIG. 4 is a schematic block diagram illustrating the storage system 300 of FIG. 3 having continuous data-transfer, according to certain embodiments. Rather than including store and forward write buffers 314, the controller 306 includes write buffers 402. Furthermore, the FIM 320 includes a scheduler 404 and a rate fill measurer unit 406. After data is encoded by the encoder unit 312 and passed to the write buffers 402, information regarding the amount of data being sent to the write buffers 402 is forwarded to the rate fill measurer unit 406. Likewise, when data is retrieved from the NVM 324 and passed from the read buffers 318 to the decoder unit 316, information regarding the amount of data being sent from the read buffers 318 is forwarded to the rate fill measurer unit 406. It is to be understood that while the plural buffer is utilized, a singular buffer, such as a write buffer and a read buffer, may be applicable in the embodiments described.

The rate fill measurer unit 406 may determine whether the fill rate of the write buffers 402 and the amount of data held in the write buffers 402 or the emptying rate of the read buffers 318 and the amount of data held in the read buffers 318 is sufficient to maintain a continuous data transfer. The scheduler 404 utilizes the information and determination by the rate fill measurer unit 406 to schedule writes to the NVM 324 or reads from the NVM 324. The scheduler 404 may fine-tune the data transfer based on the emptying/filling rate and the amount of data held in each respective buffer 402, 318 in order to avoid pausing the data transfer after the data transfer has started. For example, when the scheduler 404 determines that the fill rate of the write buffers 402 is not sufficient to maintain continuous data transfer, the scheduler 404 may schedule garbage data writes to the NVM 324 during times that the write buffers 402 is refilled. Afterwards, the correct encoded data is then written to the NVM 324. In another example, when the scheduler 404 determines that the emptying rate of the read buffers 318 is not sufficient to maintain continues data transfer (i.e., the replenish rate is not sufficient), the scheduler 404 may still provide the read data, but instruct the controller 306 to not sample the read data. Afterwards, the scheduler 404 may schedule the read operation again to read the data form the NVM 324. Thus, the scheduler 404 may determine a timing of whether to send garbage data in lieu of user data to the NVM 324 or read data from the NVM 324 without sampling the data read.

In some examples, the rate fill measurer unit 406 may also determine a fullness of the write buffers 402 and the read buffers 318, where the scheduler 404 may utilize a combination of the fullness and the fill rate/emptying rate to determine when to send garbage data or instruct the controller 306 to not sample the data. In other examples, the scheduler may pre-emptively stop sending data and send garbage data or instruct the controller 306 to not sample the data prior to the write buffers 402 or the read buffers 318 emptying. For example, the pre-emptive aspect may be initiated a threshold level of the write buffers 402 or the read buffers 318. The threshold level may be a data amount equal to a value chosen based on a toggle mode (e.g., speed of the interface and filling/emptying rate of relevant buffers). In some scenarios, the data transfer starts after having only 10% of the entire page held internally in the write buffers 402, such as in a low toggle mode scenario. In other scenarios, the data transfer starts after having only 70% of the entire page held internally in the write buffers 402, such as in a high toggle mode scenario. In one example, if the write buffers 402 become empty or are about to become empty, then the scheduler 404 may stop data transfer and start sending garbage data. Thus, increasing the data being transferred on the NVM interface. Likewise, when the scheduler 404 determines that the amount of data in the write buffers 402 or the read buffers 318 is greater than some threshold and the user data transfer is paused, such that garbage data is being transferred, the scheduler 404 stops the garbage data transfer and restarts the user data transfer without changing the ALE/CLE signals and the DQS signal.

The swap between data transfer and sending garbage data may be seamless or close to seamless, such that the data transfer (referring to the DQS signal, the ALE/CLE signals, and other relevant signals that are paused when data transfer is paused) is not paused. For example, referring back to FIG. 2, the CLE/ALE signals remain asserted low and the DQS signal continues to toggle between high and low when the data transfer swaps from sending write data (e.g., user/host data) to sending garbage data. Therefore, latencies and inefficiencies associated with pausing data transfers may not be realized or relevant.

Figure 5:
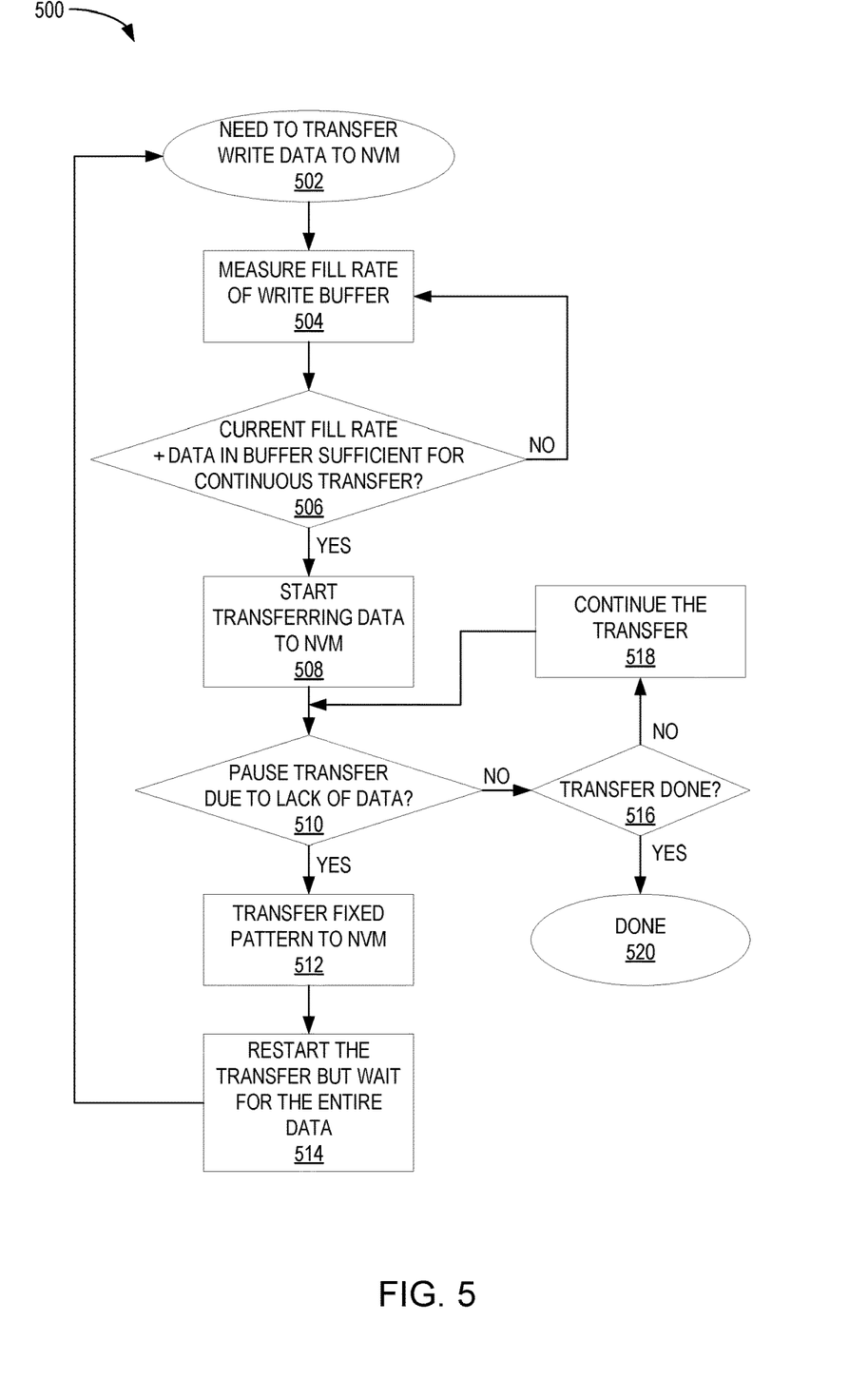
FIG. 5 is a flow diagram illustrating a method of continuous data-transfer to a memory device, according to certain embodiments.

FIG. 5 is a flow diagram illustrating a method 500 of continuous data-transfer to a memory device, such as the NVM 324 of FIG. 3, according to certain embodiments. Method 500 may be implemented by a controller, such as the controller 306 of FIG. 4. References to aspects of FIG. 4 may be utilized for exemplary purposes.

At block 502, the controller 306 determines that there is a need to transfer data to the NVM 324. For example, the need to transfer data may be due to the controller 306 receiving a write command from the host device 302. At block 504, the rate fill measurer unit 406 determines a fill rate of the write buffers 402. At block 506, the scheduler 404 determines if the fill rate of the write buffers 402 at block 504 and a current amount of data in the write buffers 402 is sufficient for continuous data transfer. If the fill rate of the write buffer 402 at block 504 and a current amount of data in the write buffers 402 is not sufficient for continuous data transfer at block 506, the method 500 returns to block 504.

However, if the fill rate of the write buffer 402 at block 504 and a current amount of data in the write buffers 402 is sufficient for continuous data transfer at block 506, then at block 508 the scheduler 404 starts transferring data stored in the write buffers 402 to the NVM 324. At block 510, the scheduler 404 determines if the data transfer needs to be paused due to a lack of data in the write buffers 402. If the data transfer does not need to be paused at block 510, then the scheduler 404 determines if the data transfer has completed at block 516. If the data transfer is completed at block 516, then method 500 is completed at block 520. However, if the data transfer is not completed at block 516, then the controller 306 continues the transfer of data from the write buffers 402 to the NVM 324 at block 518.

If the data transfer needs to be paused due to a lack of data in the write buffers 402 at block 510, then the scheduler 404 transfers a fixed pattern to the NVM 324 at block 512. The fixed pattern may be garbage data. At block 514, the scheduler 404 waits the entire data to be received at the write buffers 402 before restarting the data transfer of non-garbage data.

Figure 6:
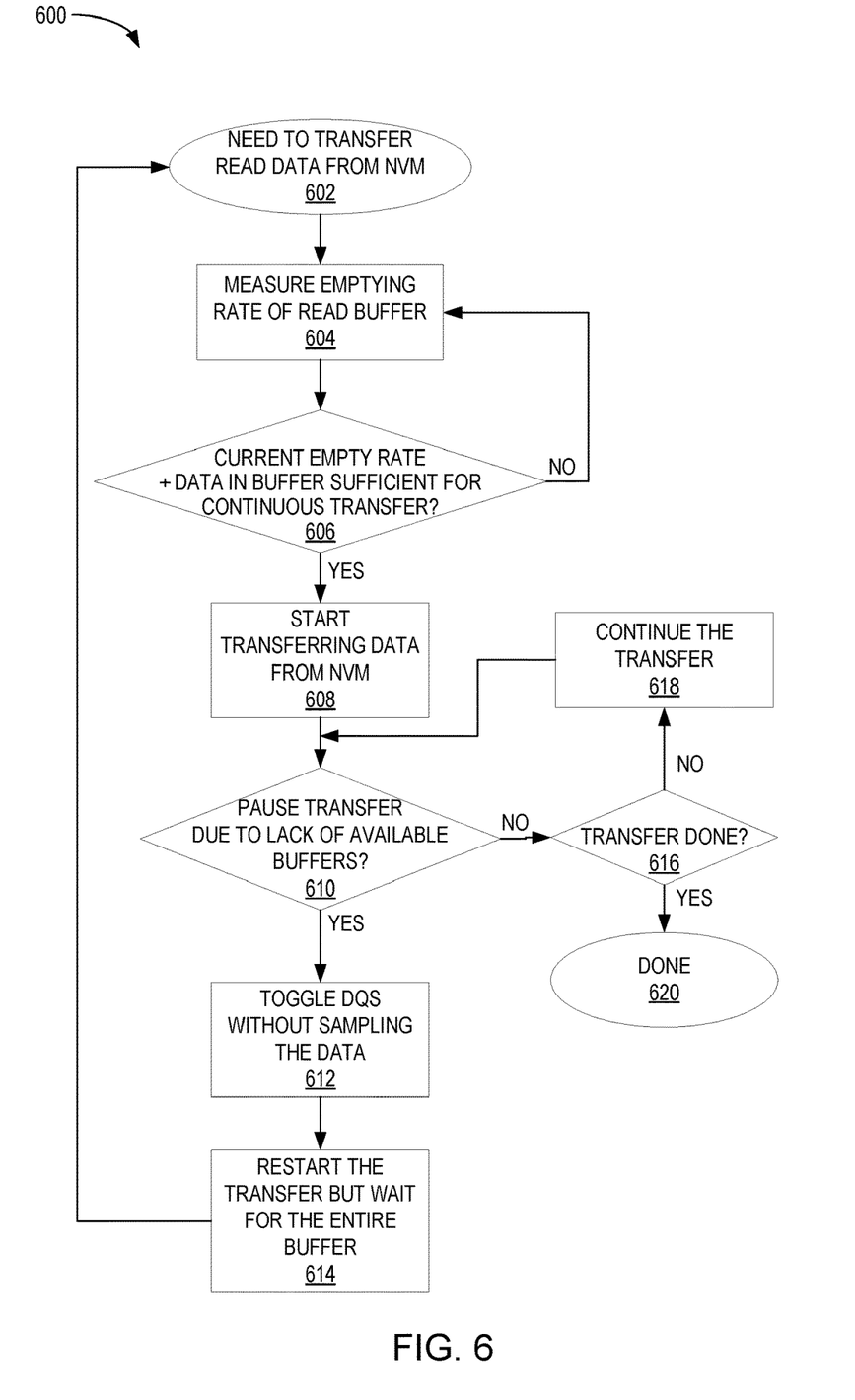
FIG. 6 is a flow diagram illustrating a method of continuous data transfer from a memory device, according to certain embodiments.

FIG. 6 is a flow diagram illustrating a method 600 of continuous data transfer from a memory device, such as the NVM 324 of FIG. 3, according to certain embodiments. Method 600 may be implemented by a controller, such as the controller 306 of FIG. 4. References to aspects of FIG. 4 may be utilized for exemplary purposes.

At block 602, the controller 306 determines that there is a need to transfer data from the NVM 324. For example, the need to transfer data may be due to the controller 306 receiving a read command from the host device 302. At block 604, the rate fill measurer unit 406 determines an emptying rate of the read buffers 318. At block 606, the scheduler 404 determines if the emptying rate of the read buffers 318 at block 604 and a current amount of data in the read buffers 318 is sufficient for continuous data transfer. If the emptying rate of the read buffer 318 at block 604 and a current amount of data in the read buffers 318 is not sufficient for continuous data transfer at block 606, the method 600 returns to block 604.

However, if the emptying rate of the read buffer 318 at block 604 and a current amount of data in the read buffers 318 is sufficient for continuous data transfer at block 606, then at block 608 the scheduler 404 starts transferring data stored in the NVM 324 to the read buffers 318. At block 610, the scheduler 404 determines if the data transfer needs to be paused due to a lack of available buffers of the read buffers 318. If the data transfer does not need to be paused at block 610, then the scheduler 404 determines if the data transfer has completed at block 616. If the data transfer is completed at block 616, then method 600 is completed at block 620. However, if the data transfer is not completed at block 616, then the controller 306 continues the transfer of data from the NVM 324 to the read buffers 318 at block 618.

If the data transfer needs to be paused due to a lack of data in the read buffers 318 at block 610, then the NVM 324 continues to toggle the DQS and the controller 306 does not sample the data from the NVM 324 at block 612. At block 614, the scheduler 404 waits the entire data to be received at the read buffers 418 before restarting the data transfer of data from the NVM 324, where the read data is sampled when the data transfer is restarted.

By implementing alternative techniques in lieu of sending user data when data transfer needs to be paused due to a lack of data, overall data storage device performance may be improved.

In one embodiment, a data storage device includes a memory device and a controller coupled to the memory device. The controller is configured to deliver a continuous DQS signal, determine whether a fill rate of write buffer is sufficient to continuously send user data to the memory device, evaluate timing for sending the user data to the memory device, and transfer data to the memory device continuously with the DQS signal.

The data comprises the user data and garbage data. The user data and the garbage data are separately transferred. The garbage data is transferred to the memory device when the write buffer is empty. The controller is further configured to determine if the fill rate and a predetermined amount of data stored in the write buffer is sufficient to continuously send the user data to the memory device. The controller is further configured to re-measure the fill rate of the write buffer upon determining that the predetermined amount of data and the fill rate is not sufficient. The controller is further configured to pause transferring the user data during the data transfer. The pausing occurs when the write buffer is empty. The controller is further configured to transfer garbage data during the pausing. The controller is further configured to restart transferring the user data upon determining that the write buffer is greater than a predetermined threshold and the fill rate is sufficient to continuously send user data to the memory device.

In another embodiment, a data storage device includes a memory device and a controller coupled to the memory device. The controller is configured to deliver a continuous DQS signal, determine whether an emptying rate of read buffer is sufficient to continuously receive user data from the memory device, evaluate timing for receiving the user data from the memory device, and receive data from the memory device continuously with the DQS signal, wherein the data that is continuously received comprises user data that is sampled, wherein user data that is sampled is continuously received when the read buffer is less than full, wherein the data that is continuously received comprises user data that is not sampled, wherein user data that is not sampled is continuously received when the read buffer is full, and wherein the user data that is sampled and the user data that is not sampled are separately received.

The determining includes determining whether emptying rate and replenishment rate is sufficient to prevent the read buffer from emptying. The controller is further configured to transfer the user data that is not sampled when the emptying rate and replenishment rate is not sufficient to prevent the read buffer from emptying and continue toggling the DQS signal during the transfer of the user data that is not sampled. The controller is further configured to stop sampling a transfer of the user data when the read buffer is full and start transferring the user data that is sampled from the read buffer.

In another embodiment, a data storage device includes memory means and a controller coupled to the memory means. The controller is configured to receive/send data continuous to/from the memory means, wherein the data comprises user data and garbage data, wherein the user data and garbage data is received/sent separately, and measure a fullness of a buffer storing the data being sent/received, wherein the garbage data is sent/received when the fullness of the buffer is below a predetermined level.

The measuring includes measuring a rate of replenishment of the buffer with the user data. The buffer includes a write buffer and a read buffer distinct from the write buffer. The controller includes a flash interface module (FIM). The FIM comprises a scheduler unit. The FIM further comprises a rate fill measurer unit. The controller is further configured to deliver information to a rate fill measurer unit. The information includes an amount of user data that is being delivered to a write buffer. The controller is further configured to deliver information to a rate fill measurer unit. The information includes an amount of user data that is being delivered to a decoder from a read buffer.

While the foregoing is directed to embodiments of the present disclosure, other and further embodiments of the disclosure may be devised without departing from the basic scope thereof, and the scope thereof is determined by the claims that follow.

What is claimed is:

1. A data storage device, comprising:
   a memory device; and
   a controller coupled to the memory device, wherein the controller is configured to:
   deliver a continuous data strobe (DQS) signal;
   determine whether a fill rate of a write buffer is sufficient to continuously send user data to the memory device;
   evaluate timing for sending the user data to the memory device; and
   transfer data to the memory device continuously with the DQS signal, wherein:
   the data comprises the user data and garbage data;
   the user data and the garbage data are separately transferred;
   transferring the user data and the garbage data is based on the determining and the evaluating:
   the garbage data is transferred when an amount of the user data stored in the write buffer is less than a predetermined threshold level;
   the user data is transferred when the amount of the user data stored in the write buffer is greater than or equal to the predetermined threshold level; and
   the predetermined threshold level is dependent on a toggle mode of the data storage device.

2. The data storage device of claim 1, wherein the garbage data is transferred to the memory device when the write buffer is empty.

3. The data storage device of claim 1, wherein the controller is further configured to determine if the fill rate and an amount of data stored in the write buffer is sufficient to continuously send the user data to the memory device.

4. The data storage device of claim 3, wherein the controller is further configured to re-measure the fill rate of the write buffer upon determining that the amount of data stored in the write buffer and the fill rate is not sufficient.

5. The data storage device of claim 1, wherein the controller is further configured to pause transferring the user data during the data transfer.

6. The data storage device of claim 5, wherein the pausing occurs when the write buffer is empty.

7. The data storage device of claim 6, wherein the controller is further configured to transfer garbage data during the pausing.

8. The data storage device of claim 7, wherein the controller is further configured to restart transferring the user data upon determining that the write buffer is greater than a predetermined threshold and the fill rate is sufficient to continuously send user data to the memory device.

9. A data storage device, comprising:
   a memory device;
   a controller coupled to the memory device, wherein the controller is configured to:
   deliver a continuous data strobe (DQS) signal;
   determine whether an emptying rate of a read buffer is sufficient to continuously receive user data from the memory device;
   evaluate timing for receiving the user data from the memory device; and
   receive data from the memory device continuously with the DQS signal, wherein:
   the data that is continuously received comprises user data that is sampled;
   the user data that is sampled is continuously received when the read buffer is less than full;
   the data that is continuously received comprises user data that is not sampled;
   the user data that is not sampled is continuously received when the read buffer is full;
   the user data that is sampled and the user data that is not sampled are separately received;
   receiving the user data that is sampled and the user data that is not sampled is based on the determining and the evaluating;
   the user data that is not sampled is received when an amount of the user data that is sampled stored in the read buffer is less than a predetermined threshold level;
   the user data that is sampled is received when the amount of the user data that is sampled stored in the read buffer is greater than or equal to the predetermined threshold level; and
   the predetermined threshold level is dependent on a toggle mode of the data storage device.

10. The data storage device of claim 9, wherein the determining comprises determining whether emptying rate and replenishment rate is sufficient to prevent the read buffer from emptying.

11. The data storage device of claim 10, wherein the controller is further configured to:
    transfer the user data that is not sampled when the emptying rate and replenishment rate is not sufficient to prevent the read buffer from emptying; and
    continue toggling the DQS signal during the transfer of the user data that is not sampled.

12. The data storage device of claim 9, wherein the controller is further configured to:
    stop sampling a transfer of the user data when the read buffer is full; and
    start transferring the user data that is sampled from the read buffer.

13. A data storage device, comprising:
    memory means; and
    a controller coupled to the memory means, wherein the controller is configured to:
    receive data data continuous from the memory means, wherein:
    the data received comprises user data and garbage data; and
    the user data and the garbage data are received separately;
    send data continuous to the memory means, wherein:
    the data sent comprises user data and garbage data; and
    the user data and the garbage data are sent separately:
    measure a fullness of a write buffer storing the data being sent and a fill rate of the write buffer, wherein:
    the garbage data is sent when the fullness of the write buffer is less than a predetermined write buffer threshold level; and
    the user data is sent when the fullness of the write buffer is greater than or equal to the predetermined write buffer threshold level and when the fill rate of the write buffer is greater than a write buffer fill rate threshold; and measure a fullness of a read buffer storing data being received and an emptying rate of the read buffer, wherein:

the garbage data is received when the fullness of the read buffer is greater than a predetermined read buffer threshold level;

the user data is received when the fullness of the read buffer is less than the predetermined read buffer threshold level and when the emptying rate of the read buffer is less than a read buffer emptying rate threshold; and the predetermined write buffer threshold level and the predetermined read buffer threshold level are dependent on a toggle mode of the data storage device.

14. The data storage device of claim 13, wherein the write buffer is distinct from the write buffer.

15. The data storage device of claim 13, wherein the controller comprises a flash interface module (FIM).

16. The data storage device of claim 15, wherein the FIM comprises a scheduler unit.

17. The data storage device of claim 16, wherein the FIM further comprises a rate fill measurer unit.

18. The data storage device of claim 13, wherein the controller is further configured to deliver information to a rate fill measurer unit, and wherein the information comprises an amount of user data that is being delivered to the write buffer.

19. The data storage device of claim 13, wherein the controller is further configured to deliver information to a rate fill measurer unit, and wherein the information comprises an amount of user data that is being delivered to a decoder from the read buffer.

* * * * *